(12) United States Patent
Forte et al.

(10) Patent No.: US 7,198,812 B2
(45) Date of Patent: Apr. 3, 2007

(54) METHOD FOR PREPARATION OF A CONFECTIONERY PRODUCT

(76) Inventors: Ubaldo Lo Forte, Eschenweg 22, D-35315, Ober-Ofleiden (DE); Salvatore Venneri, Beethovenstrasse 27, D-35274, Kirchhain (DE)

( * ) Notice: Subject to any disclaimer, the term of this patent is extended or adjusted under 35 U.S.C. 154(b) by 393 days.

(21) Appl. No.: 10/213,544

(22) Filed: Aug. 7, 2002

(65) Prior Publication Data

US 2003/0049361 A1  Mar. 13, 2003

Related U.S. Application Data

(63) Continuation of application No. PCT/EP01/01319, filed on Feb. 7, 2001.

(30) Foreign Application Priority Data

Feb. 7, 2000 (DE) ................. 100 05 374

(51) Int. Cl.
 A23G 3/46 (2006.01)
 A23G 3/52 (2006.01)
 A23L 1/09 (2006.01)

(52) U.S. Cl. ............ 426/570; 426/492; 426/522; 426/572; 426/660

(58) Field of Classification Search ........ 426/564, 426/572, 570, 587, 491, 521, 522, 492, 660
See application file for complete search history.

(56) References Cited

U.S. PATENT DOCUMENTS 3,269,843 A * 8/1966 McKee et al. ............ 426/549

3,749,583 A   7/1973 Cox et al.
5,230,902 A * 7/1993 Gold et al. ............ 424/535
5,520,946 A * 5/1996 Chablaix et al. ............ 426/570

FOREIGN PATENT DOCUMENTS

| DE | 3015825 | 3/1981 |
| DE | 3727680 | 3/1988 |
| DE | 4344534 | 8/1994 |
| EP | 0779035 | 6/1997 |

OTHER PUBLICATIONS

Milchklundliches Speisen-Lexikon, 1. Auflage, 1981, Volkswirtschaftlicher Verlag Munchen, pp. 447-448.
Renner, E., "Milch und Milchprodukte in der Ernährung des Menschen", 1. Auflage, 1974, Volkswirtschaftlicher Verlag GmbH, Kempten, Verlag Thomas Mann OHG Hildesheim H Kempten, pp. 333-338, 419-421.

* cited by examiner

Primary Examiner—Arthur L. Corbin
(74) Attorney, Agent, or Firm—Dilworth & Barrese, LLP

(57) ABSTRACT

The invention relates to confectionery of long shelf-life in the form of a soft, creamy, foamed mass of stable form, comprising milk components, edible fats, sugar and/or artificial sweeteners and water, whereby at least part of the edible fat is in crystalline form at room temperature. The confectionery contains no lactose crystals which may be detected by the consumer, the milk protein content is 6 to 20 wt. %, the fat-free milk dry mass is in the range of 16 to 55 wt. % and the denaturation level of the milk protein is ≦20%.

4 Claims, No Drawings

METHOD FOR PREPARATION OF A CONFECTIONERY PRODUCT

This is a continuation of copending application Ser. No. PCT/EP01/01319 filed Feb. 7, 2001.

THE BACKGROUND OF THE INVENTION

The present invention relates to confectionery based on milk components, a process for the production thereof and consumer products obtainable through this process.

DE-30 15 825 C2 describes confectionery with a long shelf-life in the form of a soft mass on the basis of an oil-in-water emulsion which has been foamed with an inert gas, contains milk components, edible fat, sugar, monoglycerides and water and has a pH in the range of 6.2 to 7.5. The consistence of the confectionery ranges from a spreadable cream to a comparatively compact paste suitable for cutting. It has a stable form and a long shelf-life and does not comprise any lactose crystals detectable by the consumer. In addition, at least part of the edible fat is contained in crystallised form. Preparation of this confectionery starts with sugared, partially skimmed condensed milk which forms the main component of an aqueous paste. This paste is processed to an oil-in-water emulsion with an oil phase containing edible fats and monoglycerides. After that, the emulsion is pasteurised, blended with lactose seed crystals and foamed by blowing in an inert gas. With stirring and cooling the emulsion, at least part of the edible fat is crystallised.

When preparing condensed milk, temperatures of 100 to 120° C. are usually employed for 1 to 3 minutes to pasteurise the milk and 65 to 70° C. to concentrate the milk by evaporation, resulting in partial denaturation of the whey proteins.

In addition, DE-43 44 534 C1 describes a foamed milk cream prepared by heating milk and/or milk products adjusted to a certain fat and protein content both in order to denature the serum proteins and for bacteriological reasons, then stirring in honey, dry components and flavouring substances into the milk, preparing a blend of fat(s) with emulsifiers and/or stabilisers, blending this mixture with the milk blend prepared earlier and heating it for bacteriological reasons, followed by cooling the blend to a whipping temperature, whipping the blend, and then allowing the whipped blend to cool and crystallise.

However, the process described above results in a confectionery containing a considerable portion of denatured whey proteins.

The prior art also includes confectionery made of fresh pasteurised whole milk (fresh milk) and skimmed milk powder as a milk base. Owing to the high temperatures employed during preparation, the skimmed milk powder contains more denatured whey proteins and loses more vitamins.

For reasons of nutritional physiology, however, the presence of natural milk protein (low denaturation level of the whey proteins) accompanied by a high milk protein content and a high dry milk mass is desirable.

SUMMARY OF THE INVENTION

The object of the invention is to provide a confectionery which is improved vis-à-vis known confectioneries under the aspects of nutritional physiology.

This object is achieved by a confectionery of long shelf-life in the form of a soft, creamy, foamed mass of stable form comprising milk components, edible fats, sugar and/or sugar substitutes and water, at least part of the edible fat being contained in crystallised form at room temperature and the confectionery not containing any lactose crystals detectable by the consumer, characterised by a milk protein content of 6 to 20 wt.-% based on the total weight of the confectionery, a fat-free dry milk mass of 16 to 55 wt.-% based on the total weight of the confectionery, and a denaturation level of the whey protein of $\leq 20\%$.

DESCRIPTION OF THE PREFERRED EMBODIMENTS

The confectionery of the invention has a long shelf-life. In other words, it has a shelf-life of at least 6 months when stored in a cool place ($\leq 12°$ C.), e.g. in a refrigerator or a refrigeration shelf; i.e. it will not give rise to objections under the aspect of microbiology. The long shelf-life of the confectionery of the invention essentially results from its content of dry milk mass and sugar or a sugar substitute and the fact that it is pasteurised during its preparation. Milk protein and sugar or a sugar substitute cause the binding of water and reduce the water activity. Preferably, the water activity $a_w$ is $\leq 0.9$.

In addition, the confectionery of the invention is soft and therefore easy to spread. The term "soft" characterises the strength of the confectionery and may be described by the effective viscosity which preferably has values of 100 to 5000 Pas, especially preferably 500 to 2000 Pas, at a shear gradient of $0.5$ s$^{-1}$ and a temperature of 20° C.

The creamy consistence of the confectionery of the invention is especially adjusted by the dry milk mass, the melting range of the fats, the sugar and sugar substitute portion and the water content. A confectionery is deemed "creamy" when its effective viscosity decreases as the shear gradient increases. Accordingly, the property of creaminess of the confectionery of the invention is established by measurement technology through the viscosity pattern in dependence of the shear gradient.

The confectionery of the invention also has a stable form (i.e., it has dimensional stability). From a Theological point of view, this means that it has a yield point and therefore does not yield under the influence of gravity.

In addition, the confectionery of the invention is foamed and is preferably characterised by a density of 0.55 to 0.75 g/cm$^3$ and an area of interface of 1.300 to 2.500 cm$^2$/cm$^3$.

The milk components in the confectionery of the invention comprise the milk proteins derived from the milk, the lactose, the milk salts and the milk vitamins as well as, optionally, the milk fat if whole milk or partially skimmed milk rather than just skimmed milk is used to prepare the confectionery.

The edible fats contained in the confectionery of the invention are composed of the milk fat and/or vegetable and/or animal fats added during the preparation process, such as palm oil, pure butter fat or margarine. Preferably, the total content of edible fat in the confectionery of the invention is 15 to 50 wt.-%, especially preferably 20 to 45 wt.-%, at least part of the fat being present in the crystallised state at room temperature. Preferably, the melting enthalpy of the fat is at least 10 Joule/g in a temperature range of 20 to 50° C.

The sugar in the confectionery of the invention includes the lactose derived from the milk and sugars added during preparation, e.g. in the form of honey, sucrose, lactose, glucose, fructose, maltose and galactose. The sugar content of the confectionery of the invention may be substituted in full or in part with sugar substitutes (such as sorbitol, maltitol, isomaltol, xylitol), oligosaccharides and oligofructose. Preferably, the total content of sugars and sugar substitutes is in the range of 8 to 45 wt.-%, especially preferably at 10 to 40 wt.-%.

According to another preferred embodiment of the confectionery of the invention, the water content is 13 to 40 wt.-%, especially preferably 20 to 35 wt.-%.

Further, the confectionery of the invention preferably has a pH value which corresponds to that of unfermented milk products and is typically in the range of 6.2 to 7.5.

The confectionery of the invention may also contain emulsifiers, preferably mono- and/or diglycerides, usually in an amount of 0 to 1 wt.-%.

The confectionery of the invention may also contain further ingredients. In order to adjust the consistence, polysaccharides such as starch or maltodextrin may be used. In order to adjust the flavour and colour tone, cocoa, flavours, sweeteners and colouring agents may be included. In order to increase the physiological valence of the confectionery of the invention, it is possible to include prebiotics or probiotics.

The confectionery of the invention is characterised by a high (fat-free) dry milk mass and a high milk protein content; at the same time, the denaturation level of the whey proteins is very low.

Owing to the low level of denaturation, the damage to the protein is small and the content (percentage) of native milk protein high. Therefore, few vitamins are lost in comparison with the starting milk product used for the preparation.

Preferably, the fat-free dry milk mass amounts to 16 to 37 wt.-%. The content of milk protein is preferably 6 to 14 wt.-%. In another preferred embodiment, the level of denaturation of the whey proteins is ≦15%, especially preferably ≦10%.

The low level of denaturation in the confectionery of the invention results in a very intense milk flavour. In addition, it is possible to prepare the confectionery of the invention without emulsifiers.

A high content of unprocessed milk protein is significant under the aspect of nutritional physiology, because native proteins may be fully utilised in the human body.

The confectionery of the invention may be prepared by a process comprising the following steps:
a) mixing pasteurised fresh whole milk and/or pasteurised fresh partially skimmed milk and/or pasteurised fresh skimmed milk with sugar and/or sugar substitutes and, optionally, additional ingredients;
b) concentrating the blend obtained in step a) by gentle evaporation at a temperature of ≦60° C. and a pressure of <1 bar to the desired dry substance content;
c) admixing a fatty phase containing edible fats and, optionally, emulsifiers with the concentrated aqueous mixture obtained in step b);
d) pasteurising the confectionery obtained in step c) at a maximum temperature of 80° C.;
e) cooling the confectionery and admixing lactose microcrystals with the confectionery; and
f) additional cooling of the confectionery, foaming of the confectionery by blowing in gas and crystallisation of at least part of the edible fat of the confectionery.

The preparation process of the invention is described in detail below with reference to individual process steps.

In step a), pasteurised fresh whole milk or pasteurised fresh partially skimmed milk or pasteurised fresh skimmed milk is used. According to the Official Regulations Concerning Milk (version of Apr. 24, 1995), this fresh milk has undergone a brief heating at 72 to 75° C. in a continuous flow with a holding time in the hot zone of 15 to 30 seconds; after this short-time heating, it has a negative phosphatase index and a positive peroxidase index.

The thus pasteurised fresh whole milk or pasteurised fresh partially skimmed milk or pasteurised fresh skimmed milk is mixed with sugar and/or sugar substitutes. As a rule, mixing is carried out at a temperature of ≦60° C. in a continuous mixing device or in batch containers.

In order to adjust the consistence, the flavour and colouring as well as the physiological valence, additional ingredients such as polysaccharides, cocoa, flavours such as vanillin, sweeteners and colouring agents, probiotics and prebiotics may be admixed with the milk.

Concentration to the desired dry substance content in accordance with step b) is carried out in an evaporator or by freeze-drying at temperatures of ≦60° C. and a low pressure of <1 bar.

In the preparation according to step c), the aqueous phase obtained in step b) (concentrated blend) is preferably charged in an amount of 50 to 85 wt.-% and mixed with the fatty phase, preferably in an amount of 15 to 50 wt.-%.

In general, vegetable and/or animal fats are used as the fatty phase, for example palm oil, pure butter fat or margarine all of which are edible fats. The use of emulsifiers, preferably mono- or diglycerides, is possible.

Mixing in step c) is generally carried out at a temperature of ≦60° C. so that the liquid phases are maintained during the mixing operation.

It is possible to add the fatty phase as in step c) directly to the blend obtained from step a) and then to adjust the desired dry substance content by evaporation (step b)).

The subsequent pasteurisation step d) for the confectionery is carried out at a temperature of 80° C. maximum. As a rule, the pasteurisation temperature is 70 to 80° C., and the pasteurisation process takes 1 to 4 minutes. In order to ensure that the total amount of water is present in the finished product, care must be taken during pasteurisation to avoid losses of water by vaporisation or removal of water. Therefore, it is advisable to use sufficient hydrostatic pressure.

After the pasteurisation phase, the confectionery is cooled in step e), preferably to a temperature of 60 to 30° C., e.g. by using a cooling device connected to the outlet of the pasteurisation apparatus.

The cooled confectionery is then seeded with a small amount of little lactose seed crystals on which the dissolved lactose may then crystallise without forming any sensory "sandiness". It is possible to prepare a suspension of seed crystals and a liquid and to add this to the confectionery in doses continuously.

The confectionery is then cooled further in step f), for example by means of one or more cooling device(s), e.g. to 10 to 20° C. During this phase, the confectionery is foamed, by injecting or blowing a dosed stream of gas, preferably an inert gas (e.g. nitrogen) into the confectionery by means of an injector.

In addition, at least a portion of the edible fat crystallises.

The cold foamed confectionery resulting from the process of the invention may be filled into airtight containers as is by an antiseptic method and sold.

In addition, the confectionery of the invention lends itself to direct use as a component of an edible product, for example as a filling of a baked product, e.g. a milk-cream biscuit, where the confectionery is placed on a baked layer or sandwich-like between two or more baked layers, or as a filling in a rolled baked product.

The confectionery of the invention may also be used as a coating or filling of a pastry. In addition, the confectionery of the invention may be used as a filling, part of a filling or decoration of filled chocolate products or sweets.

Finally, it is possible to use the confectionery of the invention as a dessert, dessert component or sandwich spread.

Below, the invention will be illustrated in detail on the basis of two examples.

EXAMPLE 1

In order to obtain 100 kg of milk cream (confectionery), a total of 142.6 kg of water is removed from a mixture of 190.1 kg of pasteurised fresh whole milk (water content 87.5%, dry milk mass 12.5% and fat-free dry milk mass 9% according to the Nutritional Value Tables for Milk and Milk Products compiled by E. Renner, 1992), 18.2 kg of sucrose, 7.5 kg of honey and 0.05 kg of vanillin by means of an evaporator operated at 52 to 58° C. (dry substance content of the concentrated blend: 65.74%)

At 55° C., 25.93 kg of palm oil are added to the aqueous concentrated mixture obtained (73.25 kg) and mixed intensely for 2 minutes.

Then the crude cream obtained is guided through a pasteurisation apparatus (scrape heat exchanger) at a temperature of 70° C. for 3.5 minutes.

The pasteurised cream is then directed into a first cooling device (scrape cooler) where it remains at 44° C. for 3.5 minutes. Then a dispersion of lactose microcrystals (0.005 kg) and palm oil (0.8 kg) is added continuously by means of a dosing pump.

The cream flows into a second cooling device (scrape cooler) where it is held at 18° C. for 3.5 minutes. During this residence time, the cream is foamed with nitrogen by means of an injector so that the density of the foamed cream in this process step is in the range of 0.5 to 0.6 g/cm$^3$. The hourly output of this device is approx. 26 kg of cream. Downstream of the second cooling device, the cold cream is filled into a container suitable for airtight sealing or placed between two baked layers.

The composition of the above cream was determined by analysis as follows:

| | |
|---|---|
| Milk protein content | 6.42 wt. % |
| Sugar content | 32.09 wt. % |
| Edible fat content | 34.61 wt. % |
| Mineral salts | 1.25 wt. % |
| Milk salt calcium | 0.211 wt. % |
| Water content | 24.34 wt. % |
| pH value | 6.55 |
| Total dry milk mass | 23.97 wt. % |
| Fat-free dry milk mass | 17.07 wt. % |
| Level of denaturation of the whey proteins | 7% |
| Vitamin A (mg/100 g) | 0.042 |
| Vitamin B$_1$ (mg/100 g) | 0.088 |
| Vitamin B$_2$ (mg/100 g) | 0.45 |
| Vitamin B$_6$ (mg/100 g) | 0.75 |
| Vitamin B$_{12}$ (μg/100 g) | 0.72 |
| Vitamin D$_3$ (μg/100 g) | 5.8 |
| Vitamin E (mg/100 g) | 0.61 |
| Vitamin K$_1$ (μg/100 g) | 1,6 |
| Biotin (μg/100 g) | 4.12 |
| Folic acid (μg/100 g) | <8 |
| Niacin (mg/100 g) | 0.23 |
| Pantothenic acid/vitamin B$_3$ (mg/100 g) | 0.90 |
| α-Lactalbumin (%) | 0.12 |

-continued

| | |
|---|---|
| β-Lactoglobulin (%) | 0.70 |
| Size of the sugar crystals (95%) | <12 μm |
| Density | 0.619 g/cm$^3$ |
| Area interface | 1533 cm$^2$/cm$^3$ |

The following analytical processes were used to determine the composition of the cream:

| | |
|---|---|
| Dry mass/water | IDF 21B: 1987 (Sea sand 102° C.) |
| Edible fat | IDF 126A: 1988 (Weibull method) |
| Milk fat | DGF C-V 9a (determination via semi-micro butyric acid number) |
| Protein (N × 6.38) | IDF 20B: 1993 (Kjeldahl method) |
| Lactose/galactose | § 35, Federal Food Law, L 01.00-17; enzymatically, Boehringer test kit |
| Sucrose/glucose/fructose | Enzymatically, Boehringer test kit |
| Ash | VDLUFA VI C 10.2 (550° C.) |
| Calcium | Gravimetrically |
| Level of denaturation | SDS-PAGE electrophoresis: The denaturation level of β-lactoglobulin was determined electrophoretically as a standard for the denaturation of the whey proteins present in the cream. The degree of denaturation given in % indicates the portion of native β-lactoglobulin vis-à-vis the total β-lactoglobulin (after a complete reduction) and is calculated from the proportion of the peak areas to each other. The sample to be tested is pre-treated with sodium dodecyl sulfate (SDS) in order to unfold the milk proteins. With the subsequent complete reduction of the unfolded protein molecules by means of dithiothreitol (DTT) the monomeric reduced form of the total β-lactoglobulin is obtained. In a parallel assay, the sample is treated only with SDS in order to be able to determine the native, unreduced portion of the lactoglobulin. The lower the native β-lactoglobulin portion, the higher the level of denaturation. Separation of the individual milk proteins is carried out by means of pore gradient gel electrophoresis according to molecular size. The fixed and stained proteins are subjected to a quantitative evaluation after densitometric measurement. |

-continued

| | |
|---|---|
| | The level of denaturation based on β-lactoglobulin (indicated in %) is calculated by the following formula: $$D = 1 - \frac{PF_{\beta\text{-lactoglobulin native}} \times 100}{PF_{\beta\text{-lactoglobulin reduced}}}$$ D in % PF = peak area of β-lactoglobulin band the native or reduced state. |
| Vitamin $B_1$ | Fluorimetrically |
| Vitamin $B_2$ | HPLC |
| Vitamin $B_6$ | HPLC |
| Vitamin $B_{12}$ | Turbidimetrically according to USP XXIII 1995, M.171 |
| Vitamin $K_1$ | HPLC |
| Vitamin $D_3$ | Sec. 35, Federal Food Law L 49.00-1; HPLC |
| Vitamin A | Sec. 35, Federal Food Law L 49.00-3; HPLC |
| Vitamin E | Sec. 35, Federal Food Law L 49.00-3; HPLC |
| Niacin | Turbidimetrically according to USP XXIII, 1995, M.441 |
| Folic acid | Microbiologically |
| Pantothenic acid/vitamin $B_3$ | Turbidimetrically according to USP XXIII, 1995, M.91 |
| Biotin | Turbidimetrically according to USP XXI, 3rd suppl., 1986, M.88 |
| α-Lactalbumin | IDF 178: 1996 (HPLC) |
| β-Lactoglobulin | IDF 178: 1996 (HPLC) |

The cream obtained in example 1 was also examined with regard to its rheological properties.

At a shear gradient of 0.5 $s^{-1}$, the cream has an effective viscosity of 1750 Pas at 20° C., i.e. the cream is soft.

At a shear gradient of 50 $s^{-1}$, the cream has an effective viscosity of 6.5 Pas at 20° C. The fact that the effective viscosity decreases as the shear gradient increases is indicative of the creamy character.

The measuring device to determine the effective viscosities was a rotation rheometer controlled by the shear rate. The measuring system consisted of a plate/plate set-up (steel version) with a 20 mm diameter of the upper plate and a plate gap of 1 mm. The relaxation period before measuring started was 120 seconds; measurements were taken twice in a measuring range of 0.1 to 100 $s^{-1}$ in 10 minutes.

The cream does not flow under the influence of gravity and therefore has dimensional stability.

Since 95% of the sugar crystals are smaller than 12 μm, no "sandiness" is perceived sensorily in the cream. The distribution of the particle size of the sugar crystals under the light microscope was determined by means of a transmitted light method.

The crystallinity of the fat was determined with a disc device in a temperature range of 0 to 60° C. and a heating rate of 2 K/min. Both crystallised and liquid fat portions were found.

The foamed structure of the cream was determined by means of a scanning electron microscope (SEM). For this purpose, the sample tested was frozen in subcooled liquid nitrogen, then broken up and coated with gold or platinum in a cryo-preparation device and guided into the electron microscope. The photos made with the electron microscope show that the foam has fine pores which are quantified by the area interface. With the aid of the SEM photographs, the area interface was determined by photo analysis/stereology. SEM pictures of the foam structures magnified 350-fold served as models. The contours of the gas bubbles were marked (full recording of bubbles per image; at least 800 bubbles per measurement). The image was scanned and a binary image (bubbles and substrate) generated. When evaluating the images, the number of phase transitions between the substrate and the bubbles along a crowd of parallel lines were recorded. The area interface is calculated by the number of phase transitions per total length of the line.

The long shelf-life of the cream results from the microbiological data determined after six months cool storage from the date of production. The germ counts (Sec. 34, Federal Food Law (LMBG) L 01.00-5), yeasts (Sec. 35, LMBG L 01.00-37), mould fungi (§ 35, LMBG L 01.00-37) and entero-bacteria (VDLUFA VI M 7.4.2) determined by the plate-casting method were so low that no objections can be raised under a microbiological aspect.

In addition, the cream of example 1 has a characteristic milk flavour.

EXAMPLE 2

In order to obtain 100 kg of milk cream (confectionery), a total of 327 kg of water is removed from a mixture of 397.5 kg of pasteurised fresh skimmed milk (water content 90.6%, total dry mass 9.4% and fat-free dry milk mass 9.3% according to the Nutritional Value Tables for Milk and Milk Products compiled by E. Renner, 1992), and 9.5 kg of sucrose by means of an evaporator operated at 52 to 58° C. (dry substance content of the concentrated blend: 58.58%).

At 55° C., 19.2 kg of palm oil are added to the aqueous concentrated mixture obtained (80.00 kg) and mixed intensely for 2 minutes.

Then the crude cream obtained is guided through a pasteurisation apparatus (scrape heat exchanger) at a temperature of 70° C. for 1.5 minutes.

The pasteurised cream is then directed into a first cooling device (scrape cooler) where it remains at approx. 44° C. for 3.5 minutes. Then a dispersion of lactose microcrystals (0.005 kg) and palm oil (0.8 kg) is added continuously by means of a dosing pump.

The cream flows into a second cooling device (scrape cooler) where it is held at 18° C. for 3.5 minutes. During this residence time, the cream is foamed with nitrogen by means of an injector so that the density of the cream in this process step is adjusted in the range of 0.5 to 0.6 $g/cm^3$. The hourly output of this device is approx. 26 kg of cream. Downstream of the second cooling device, the cold cream is filled into a container suitable for airtight sealing or placed between two baked layers.

The composition of the above cream was determined by analysis as follows:

| | |
|---|---|
| Milk protein content | 13.65 wt. % |
| Sugar content | 27.71 wt. % |
| Edible fat content | 21.50 wt. % |
| Mineral salts | 3.02 wt. % |
| Milk salt calcium | 0.485 wt. % |
| Water content | 32.45 wt. % |
| pH value | 6.57 |
| Total dry milk mass | 36.14 wt. % |
| Fat-free dry milk mass | 34.84 wt. % |
| Level of denaturation of the whey proteins | 8% |
| Vitamin A (mg/100 g) | 0.012 |
| Vitamin $B_1$ (mg/100 g) | 0.14 |

-continued

| | |
|---|---|
| Vitamin $B_2$ (mg/100 g) | 0.84 |
| Vitamin $B_6$ (mg/100 g) | 0.24 |
| Vitamin $B_{12}$ (μg/100 g) | 1.01 |
| Vitamin $D_3$ (μg/100 g) | 4.1 |
| Vitamin E (mg/100 g) | 0.68 |
| Vitamin $K_1$ (μg/100 g) | <1 |
| Biotin (μg/100 g) | 7.4 |
| Folic acid (μg/100 g) | <8 |
| Niacin (mg/100 g) | 0.39 |
| Pantothenic acid/vitamin $B_3$ (mg/100 g) | 1.71 |
| α-Lactalbumin (%) | 0.40 |
| β-Lactoglobulin (%) | 1.69 |
| Size of the sugar crystals (95%) | <17 μm |
| Density | 0.680 g/cm$^3$ |
| Area interface | 1908 cm$^2$/cm$^3$ |

The composition of the above cream and its properties were determined with the same analytical processes as in example 1.

The rheological properties of the cream obtained in example 2 were determined as follows:

At 0.5 s$^{-1}$, the cream has an effective viscosity of 1450 Pas at 20° C., i.e. the cream is soft.

At a shear gradient of 50 s$^{-1}$, the cream has an effective viscosity of 2.5 Pas at 20° C. Since the effective viscosity decreases as the shear gradient increases the consistence is creamy.

The cream of this patent has yield point, i.e. it does not flow under the influence of gravity and therefore has dimensional stability.

The crystallinity of the fat was determined with the aid of a DSC device; both crystallised and liquid portions were found.

Since 95% of the sugar crystals are smaller than 17 μm, no "sandiness" is perceived sensorily.

The foamed structure of the cream was clearly determined by means of a scanning electron microscope (SEM) and the cryo-preparation method. The foam has fine pores; determination of the area interface by means of image analysis/stereology showed an area interface of 1908 cm$^2$/cm$^3$.

On the basis of the microbiological data (germ count, yeasts, mould fungi and entero-bacteria) after six months cool storage from the production date, no objections can be raised under a microbiological aspect. In other words, the cream has a long shelf-life.

In addition, the cream of example 1 has a characteristic milk flavour.

The invention claimed is:

1. A process for preparing a confectionery product having a long shelf life in the form of a soft, creamy and stable foamed mass, comprising the following process steps:
   a) mixing pasteurized fresh whole milk and/or pasteurized fresh partially skimmed milk and/or pasteurized fresh skimmed milk with sugar and/or sugar substitutes;
   b) concentrating the mixture obtained in step a) by gentle evaporation at a temperature of ≦60° C. and a pressure of <1 bar to the desired dry substance content;
   c) admixing a fatty phase containing edible fat and optionally, emulsifiers, with the mixture obtained in step b): to obtain a confectionery;
   d) pasteurizing the confectionery obtained in step c) at a maximum temperature of 80° C.;
   e) cooling and admixing lactose microcrystals with the pasteurized confectionery;
   and then
   f) additionally cooling the confectionery and foaming the confectionery by blowing gas therein and crystallizing at least part of the edible fat in the confectionery.

2. The process for preparing a confectionery product having a long shelf life in the form of a soft, creamy and stable foamed mass of claim 1 wherein at least one additional ingredient selected from the group consisting of polysaccharides, cocoa, flavors, sweeteners, coloring agents, probiotics and prebiotics is added in step a).

3. A process for preparing a confectionery product having a long shelf life in the form of a soft, creamy and stable foamed mass comprising the following process steps:
   a) mixing pasteurized fresh whole milk and/or pasteurized fresh partially skimmed milk and/or pasteurized fresh skimmed milk; with sugar and/or sugar substitutes;
   b) admixing a fatty phase containing edible fat and optionally, emulsifiers with the mixture obtained in step a);
   c) concentrating the mixture obtained in step b) by gentle evaporation at a temperature of ≦60° C. and a pressure of <1 bar to the desired dry substance content to obtain a confectionery;
   d) pasteurizing the confectionery obtained in step c) at a maximum temperature of 80° C.;
   e) cooling and admixing lactose microcrystals with the pasteurized confectionery;
   and then
   f) additionally cooling the confectionery and foaming the confectionery by blowing gas therein and crystallizing at least part of the edible fat in the confectionery.

4. The process for preparing a confectionery product having a long shelf life in the form of a soft, creamy and stable foamed mass of claim 3 wherein at least one additional ingredient selected from the group consisting of polysaccharides, cocoa, flavors, sweeteners, coloring agents, probiotics and prebiotics is added in step a).

* * * * *